April 4, 1950  C. H. KOONZ  2,502,794
POULTRY DRESSING METHOD
Filed May 4, 1946
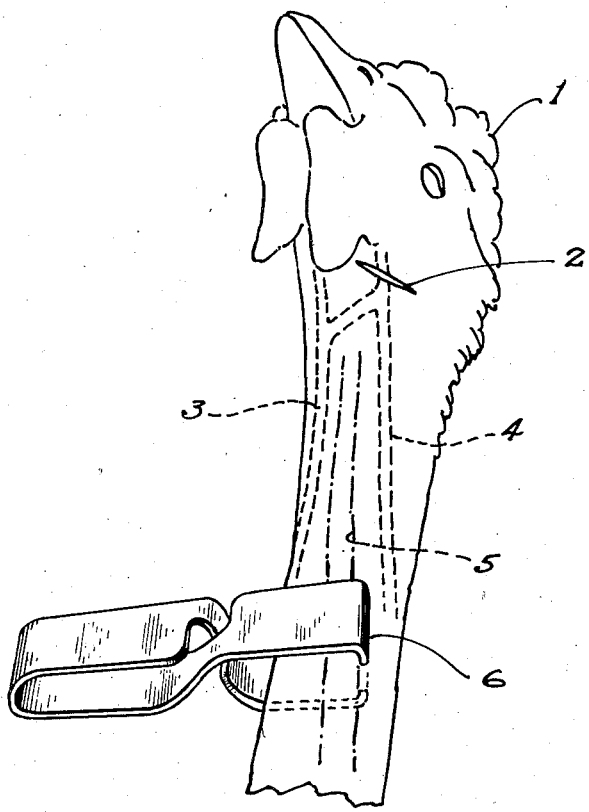
INVENTOR.
Carl H. Koonz
BY
R. G. Story
ATTORNEY

UNITED STATES PATENT OFFICE 2,502,794

POULTRY DRESSING METHOD

Carl H. Koonz, Chicago, Ill., assignor to Swift & Company, Chicago, Ill., a corporation of Illinois Application May 4, 1946, Serial No. 667,350

5 Claims. (Cl. 17—45)

My invention relates to a method of preventing the intake of scald water in lungs and air sacs of poultry during the dressing thereof.

At present, throughout the poultry industry, it is customary to immerse birds in water at approximately 129° F. within 30 to 60 seconds after severance of the jugular vein or veins. Although the birds are insensible at this time, they often have the capacity to draw water into the lungs. As a result contamination may occur during the time that the bird is being run through the scald tank, since the scald water may contain some bacteria. Poultry dressed by the method herein described will have a longer "salable life."

By placing a water soluble dye nigrosine in the scald tank water, it has been possible to determine the frequency with which birds draw contaminated water into the respiratory apparatus. It has been determined that some birds, whether killed in the conventional manner, that is by severing the jugular veins as well as piercing the brain, or whether it is kosher killed, draws water into the lungs. Poultry dressed by the method herein described should have better keeping properties.

It is, therefore, an object of my invention to provide an improved method of dressing poultry whereby the above described disadvantages are overcome.

More specifically, an object of my invention is to block or restrict the trachea or wind-pipe of poultry after the severance of the jugular vein (or whatever other method used to kill the bird) and prior to the time that it is run through the scald tank.

Further objects and advantages of my invention will become apparent from the following description.

In the drawing:

1 indicates generally the head and neck of a chicken which represents one type of poultry to which my improved method is applicable. The location of a correct cut for severance of the jugular veins which represents the modern commercial method of killing is indicated at 2. Shown in dotted lines are the jugular veins 3 and 4 on either side of the neck.

The trachea or wind-pipe is cylindrical and consists of a great number of cartilaginous rings. At the upper end of the trachea in the region of the head of the chicken is the larynx. The trachea is located in the front of the bird's neck and is indicated by the dot-dash lines at 5 in the drawing. It has been found that scald water can be prevented from reaching the lungs of the bird by placing a clamp on the trachea. This clamp is placed on the bird so as to restrict the wind-pipe without causing any abrasions of skin or flesh. It is placed on the bird after severance of the jugular veins and prior to the time that it is run through the scald tank.

In experimenting with this method, it has become apparent that a wide variety of clamps or clips will adequately pinch off the trachea. For practical purposes, it is only necessary that the clamp or other device used for this purpose should be so constructed that the bird can be run through the scald tank and through the automatic ruffing machines without loss of the clamp or other device and without causing damage to the fingers of the defeathering machine. One particular form of clamp which has been found to operate in a very effective manner is a common battery clip. Such a clip is shown at 6 in the drawing, the clip preferably being placed on the neck of the bird so as to enclose the skin and trachea and permissibly a portion of the esophagus. It is to be understood, however, that the clip may enclose the whole neck, providing the trachea is effectively pinched off.

It is to be understood that my invention is equally applicable in dressing poultry where other methods of killing the bird are employed. For example, (1) the chicken neck may be wrung or, (2) the head may be severed by a sharp instrument or, (3) the chicken may be killed by dislocation of the neck wherein the neck is dislocated and the jugular veins broken without breaking the skin or, (4) the brain and jugular veins pierced by means of a knife inserted in the mouth of the bird.

Also, in its broadest aspect, this invention contemplates any means of shutting off the trachea or wind-pipe such as by plugging, for example, and should not be construed as limited to restriction of the trachea. Regardless of the particular method of killing or rendering the bird insensible, the essential feature of the invention is the prevention of intake of the scald tank water.

Although the invention has been described in connection with the dressing of chickens, it is applicable to the handling of other poultry such as turkeys, ducks, geese, etc.

Obviously, many modifications and variations of the invention, as hereinbefore set forth, may be made without departing from the spirit and scope thereof, and therefore only such limitations should be imposed as are indicated in the appended claims.

I claim:

1. In the method of dressing poultry wherein each bird is rendered insensible and then passed through a bath prior to plucking; the step of blocking the trachea to prevent the intake of bath liquid.

2. The method of dressing poultry comprising the successive steps of bleeding each bird, restricting the trachea thereof and passing the bird through a tank containing scalding liquid.

3. The method of dressing poultry comprising the successive steps of rendering each bird insensible, restricting the trachea of each bird and then passing each bird through a scalding bath.

4. In the method of dressing poultry wherein the poultry carcass is passed through a scalding bath prior to plucking; the step of closing off the trachea prior to immersing in the scalding bath to prevent the intake of scalding liquid.

5. The method of dressing poultry comprising the successive steps of severing the jugular vein, restricting the trachea by pinching and passing each bird through a scalding bath prior to a defeathering operation, the restricting operation serving to prevent the intake of the scalding bath liquid into the birds' respiratory systems.

CARL H. KOONZ.

REFERENCES CITED

The following references are of record in the file of this patent:

UNITED STATES PATENTS

| Number | Name | Date |
|---|---|---|
| 1,310,931 | Schnitzen et al. | July 22, 1919 |

OTHER REFERENCES

Marketing Poultry, U. S. D. A., Farmers Bulletin No. 1377, issued February 1924, revised September 1943. Pages 24 and 25 relied upon. (Copy in Division 2.)